United States Patent
Lee et al.

(10) Patent No.: US 9,998,224 B2
(45) Date of Patent: Jun. 12, 2018

(54) AUDIO SYSTEM BASED ON IN-VEHICLE OPTICAL NETWORK AND BROADCASTING METHOD THEREOF

(71) Applicant: Korea Electronics Technology Institute, Seongnam-si, Gyeonggi-do (KR)

(72) Inventors: Sang Yub Lee, Yongin-si (KR); Jae Jin Ko, Gwangju-si (KR)

(73) Assignee: KOREA ELECTRONICS TECHNOLOGY INSTITUTE, Seongnam-Si, Gyeonggi-Do (KR)

( * ) Notice: Subject to any disclaimer, the term of this patent is extended or adjusted under 35 U.S.C. 154(b) by 29 days.

(21) Appl. No.: 15/135,430

(22) Filed: Apr. 21, 2016

(65) Prior Publication Data

US 2016/0330561 A1    Nov. 10, 2016

(30) Foreign Application Priority Data

May 7, 2015  (KR) ........................ 10-2015-0063683

(51) Int. Cl.
*H04H 20/47* (2008.01)
*H04B 10/27* (2013.01)

(52) U.S. Cl.
CPC ......... *H04B 10/27* (2013.01); *H04R 2499/13* (2013.01)

(58) Field of Classification Search
CPC ..................................................... H04H 20/47
See application file for complete search history.

(56) References Cited

U.S. PATENT DOCUMENTS

| | | | | |
|---|---|---|---|---|
| 6,920,340 B2* | 7/2005 | Laderman | ............ | H04B 1/3838 359/244 |
| 8,055,004 B2* | 11/2011 | Ronen | ................ | H04M 1/6058 379/430 |
| 8,270,636 B2* | 9/2012 | Ko | ........................ | H02J 7/0013 307/46 |
| 2003/0043972 A1* | 3/2003 | Burnham | ........... | H04B 10/1141 379/56.3 |
| 2004/0076435 A1* | 4/2004 | Stolyarov | ........... | B60R 16/0315 398/75 |

(Continued)

FOREIGN PATENT DOCUMENTS

| KR | 1020040098240 A | 11/2004 |
|---|---|---|
| KR | 1020050070359 A | 7/2005 |

(Continued)

OTHER PUBLICATIONS

Korean Office Action dated Nov. 26, 2016 for corresponding Korean Patent Application No. 10-2015-0063683, citing the above reference(s).

*Primary Examiner* — Olisa Anwah
(74) *Attorney, Agent, or Firm* — Hauptman Ham, LLP

(57) ABSTRACT

An audio system based on an in-vehicle optical network and a broadcasting method thereof are provided. The audio system according to an exemplary embodiment includes: a multi-channel router which is connected to an in-vehicle optical network to receive a multi-channel audio signal from audio signals received from the optical network; and a plurality of speakers which are connected to the multi-channel router to receive the multi-channel audio signal through the multi-channel router. Accordingly, the speakers can operate by interworking with a network even when they have no function as network devices.

2 Claims, 8 Drawing Sheets

(56) References Cited

U.S. PATENT DOCUMENTS

| | | | | |
|---|---|---|---|---|
| 2006/0067697 A1* | 3/2006 | Aizpuru | ................. | H04B 10/40 398/135 |
| 2007/0061846 A1* | 3/2007 | Gollwitzer | ......... | H04B 10/2755 725/75 |
| 2011/0081032 A1* | 4/2011 | Soulodre | ................. | H04S 1/002 381/300 |
| 2012/0050191 A1* | 3/2012 | Higashida | ............ | H04B 10/272 345/173 |
| 2015/0381296 A1* | 12/2015 | Jenq | ........................ | H04S 1/007 381/2 |
| 2016/0150346 A1* | 5/2016 | Reuss | .................... | H04S 7/303 381/303 |

FOREIGN PATENT DOCUMENTS

| KR | 10-2007-0051517 A | 5/2007 |
|---|---|---|
| KR | 1020130080325 A | 7/2013 |
| KR | 10-2014-0012245 A | 2/2014 |

* cited by examiner

AUDIO SYSTEM BASED ON IN-VEHICLE OPTICAL NETWORK AND BROADCASTING METHOD THEREOF

CROSS-REFERENCE TO RELATED APPLICATION(S) AND CLAIM OF PRIORITY

The present application claims the benefit under 35 U.S.C. § 119(a) to a Korean patent application filed in the Korean Intellectual Property Office on May 7, 2015, and assigned Serial No. 10-2015-0063683, the entire disclosure of which is hereby incorporated by reference.

TECHNICAL FIELD OF THE INVENTION

The present invention relates generally to an audio system, and more particularly, to a broadcasting method in an in-vehicle network audio system.

BACKGROUND OF THE INVENTION

FIG. 1 is a view showing a related-art audio system based on an in-vehicle optical network. In the related-art in-vehicle audio system, a ring type network may be established to transmit signals to devices as shown in FIG. 1.

However, all of the associated devices in the above-described in-vehicle audio system should operate as slaves in the ring type network. Accordingly, since speakers are required to operate as network devices, there are problems that the system is complicated and extra software is required.

In addition, when the devices of the audio system are connected with one another through the ring type network, controlling loads may increase and much time may be required to restore the system when a problem arises. In addition, these problems become more serious in the case of a device having a high output.

SUMMARY OF THE INVENTION

To address the above-discussed deficiencies of the prior art, it is a primary aspect of the present invention to provide an audio system in which a multi-channel router is connected to an in-vehicle optical network and speakers are connected to the multi-channel router through optical fibers, and a broadcasting method thereof.

According to one aspect of the present invention, an audio system includes: a multi-channel router which is connected to an in-vehicle optical network to receive a multi-channel audio signal from audio signals received from the optical network; and a plurality of speakers which are connected to the multi-channel router to receive the multi-channel audio signal through the multi-channel router.

The plurality of speakers may receive the same multi-channel audio signal.

The multi-channel router may transmit the multi-channel audio signal only to some of the plurality of speakers.

The multi-channel router and the plurality of speakers may be connected with each other through optical fibers, and the multi-channel router may include an optical splitter which selectively outputs the multi-channel audio signal through output terminals connected with the plurality of speakers.

The plurality of speakers may output only some audio signals which are selected by the user from among the audio signals included in the multi-channel audio signal.

The plurality of speakers may output only some audio signals with reference to headers of the audio signals.

Delimiters may be inserted into the headers to be inserted into time slots allocated to IDs of the speakers.

According to another aspect of the present invention, an audio broadcasting method includes: receiving, by a multi-channel router, audio signals from an in-vehicle optical network and generating a multi-channel audio signal; and transmitting, by the multi-channel router, the multi-channel audio signal to a plurality of speakers.

According to exemplary embodiments described above, the speakers can operate by interworking with a network even when they have no function as network devices. In addition, according to exemplary embodiments of the present invention, the speakers constituting the audio system are connected through the optical fibers and thus are able to transmit audio signals which are resistant to noise.

In addition, according to exemplary embodiments of the present invention, the user can individually manipulate/adjust speakers having no network function.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
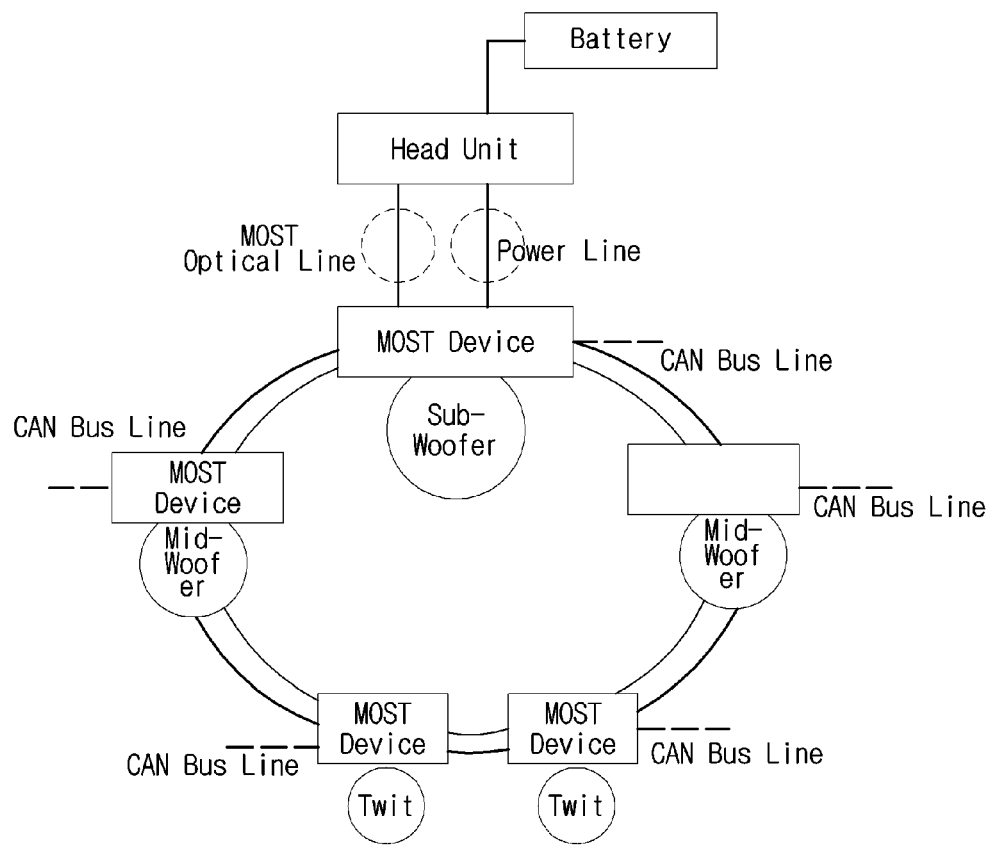
FIG. 1 is a view showing a related-art audio system based on an in-vehicle optical network.

Reference will now be made in detail to the embodiment of the present general inventive concept, examples of which are illustrated in the accompanying drawings, wherein like reference numerals refer to the like elements throughout. The embodiment is described below in order to explain the present general inventive concept by referring to the drawings.

Figure 2:
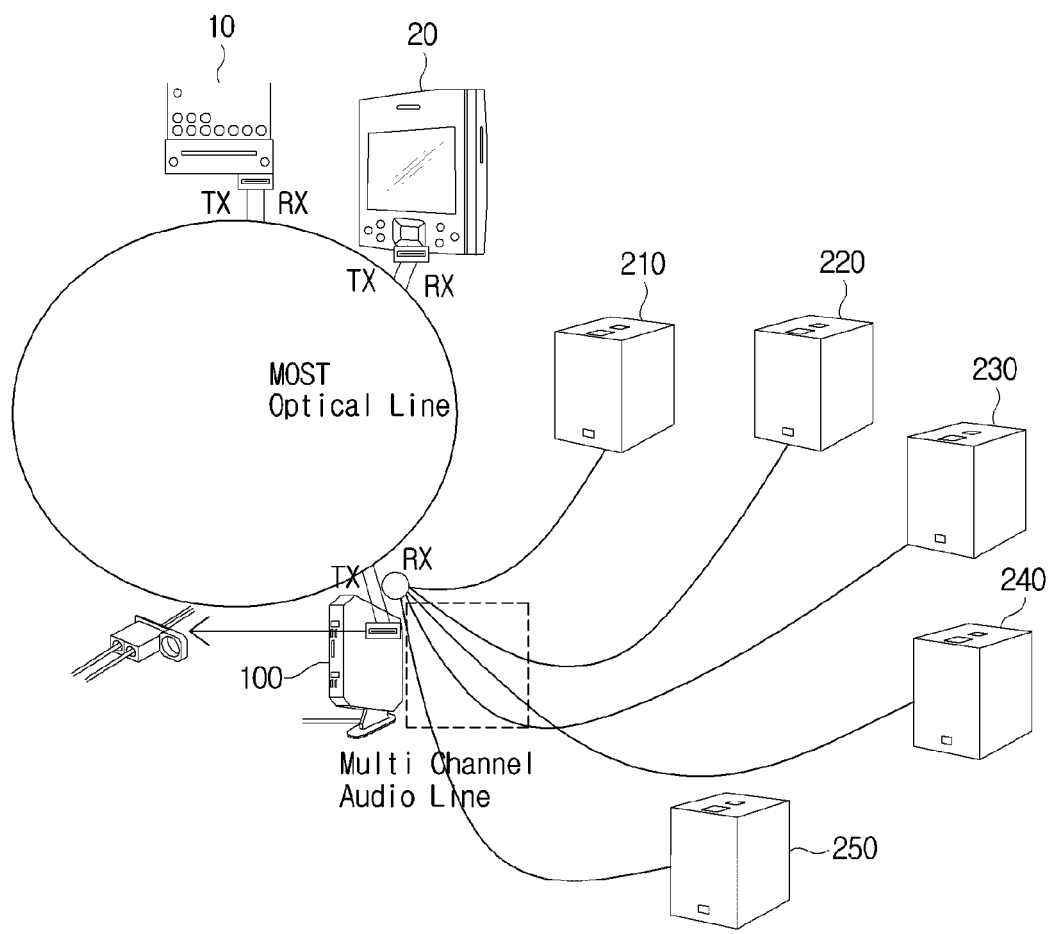
FIG. 2 is a view showing an in-vehicle audio system according to an exemplary embodiment of the present invention.

FIG. 2 is a view showing an in-vehicle audio system according to an exemplary embodiment of the present invention. The in-vehicle audio system according to an exemplary embodiment of the present invention is established by connecting a multi-channel router 100 and speakers 210-250 with each other.

The in-vehicle audio system according to an exemplary embodiment of the present invention is based on a Media Oriented System Transport (MOST) network which is a kind of in-vehicle optical network, and in this system, local lines are connected with one another via optical fibers. That is, audio sources 10 and 20 and the multi-channel router 100 are connected with each other through the optical network, and the multi-channel router 100 and the speakers 210-250 are connected with each other through optical fibers.

Only the multi-channel router 100 from among the devices constituting the audio system is connected to the optical network. That is, the speakers 210-250 are not directly connected to the optical network and are indirectly connected to the optical network via the multi-channel router 100. Accordingly, the speakers 210-250 are not required to have a network function.

The multi-channel router 100 may combine audio channels received from the audio sources 10 and 20, thereby generating a multi-channel audio signal. In addition, the multi-channel router 100 may transmit the multi-channel audio signal to the speakers 210-250 using an optical splitter.

Accordingly, the speakers 210-250 receives the multi-channel audio signal including an audio signal of a A-broadcast channel, an audio signal of a B-broadcast channel, an audio signal of a C-broadcast channel, . . . , an audio signal of an N-broadcast channel.

Figure 3:
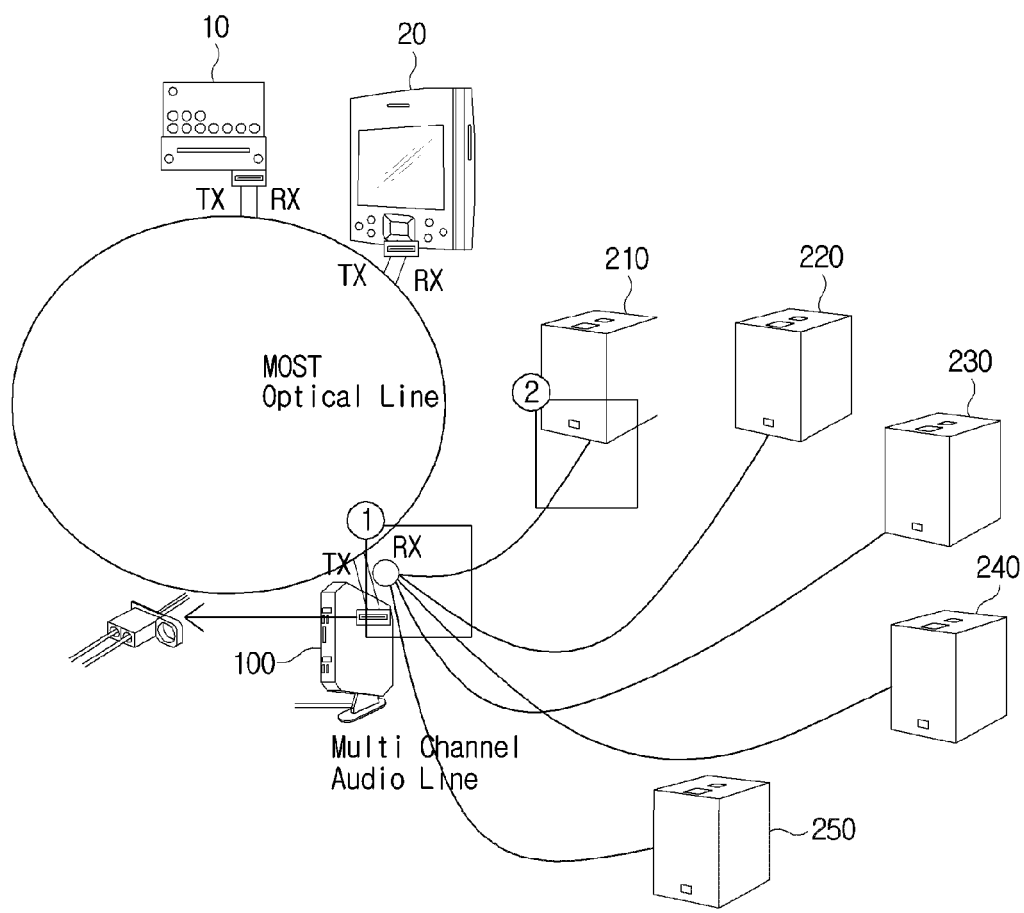
FIG. 3 is a view to illustrate a concept of an operation for broadcasting of an in-vehicle audio system according to an exemplary embodiment of the present invention.

To broadcast in the in-vehicle audio system according to an exemplary embodiment of the present disclosure, the multi-channel router 100 selectively transmits the multi-channel audio signal to the speakers 210-250 as indicated by "①" in FIG. 3, and the speakers 210-250 selectively receive audio signals included in the multi-channel audio signal as indicated by "②" in FIG. 3.

Figure 4:
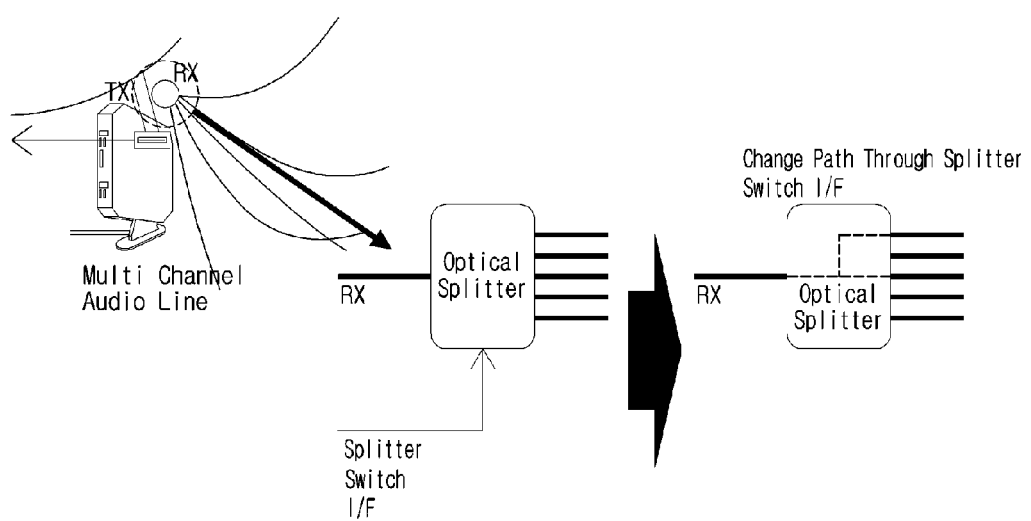
FIG. 4 is a view to illustrate a multi-channel router shown in FIG. 1 in detail.

The structure and operation of the multi-channel router 100 to achieve the operation "①" are illustrated in FIG. 4 in detail. FIG. 4 is a view to illustrate the multi-channel router 100 in detail.

As shown in FIG. 4, the multi-channel router 100 includes the optical splitter to selectively output the multi-channel audio signal received from the audio sources 10 and 20 through the optical network through output terminals connected to the speakers 210-250.

Optical fibers are connected to the output terminals to transmit the multi-channel audio signal to the speakers 210-250. The optical fibers are rarely worn out and are not influenced by noise.

The optical splitter may selectively transmit the multi-channel audio signal to the speakers 210-250. That is, the optical splitter may switch to perform the operation of:

1) transmitting the multi-channel audio signal only to speaker-1 210;
2) transmitting the multi-channel audio signal only to speaker-1 210 and speaker-3 230;
3) transmitting the multi-channel audio signal only to speaker-2 210, speaker-3 230, and speaker-5 250; or
4) transmitting the multi-channel audio signal to all of the speakers 210-250.

The multi-channel router 100 may further include digital codec and network functions, and thus may time-synchronize over the network in transmitting the multi-channel audio signal to the speakers 210-250.

Figure 5:
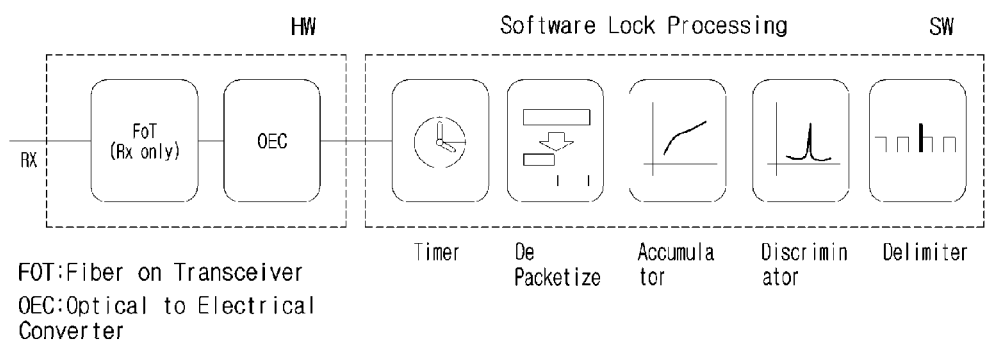
FIG. 5 is a view to illustrate speakers shown in FIG. 1 in detail.

The structure and operation of the speakers 210-250 to achieve the operation "②" of FIG. 3 are illustrated in FIG. 5 in detail. FIG. 5 is a view to illustrate the speakers 210-250 in detail.

The speakers 210-250 may reproduce and output only an audio signal of a single channel from among the audio signals included in the multi-channel audio signal received through the multi-channel router 100. The audio signal to be reproduced/outputted may be selected by a user.

To achieve this, the speakers 210 use a software lock method rather than a hardware lock method. Specifically, the audio signals forming the multi-channel audio signal are converted into electric signals through a Fiber On Transceiver (FOT) and an Optical To Electrical Converter (OEC) of the speakers 210-250.

Thereafter, the speakers 210-250 de-packetize to time-synchronize the converted electric audio signals and divide frames of packets, and accumulate the data of the frames during a predetermined time and then detect the delimiters using a discriminator.

The delimiters are inserted into time slots allocated to the IDs of the speakers 210-250. Accordingly, based on the time slots from which the delimiters are detected, the speakers 210-250 may determine whether the audio signals should be reproduced/outputted or discarded.

Figure 6:
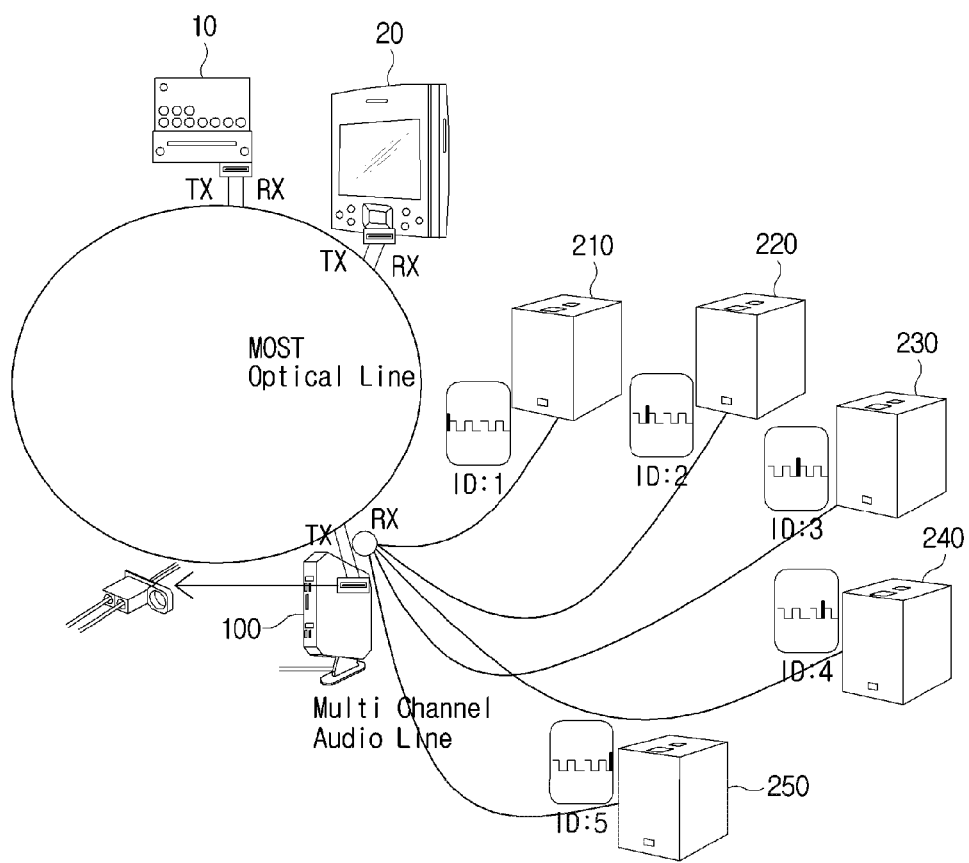
FIG. 6 is a view showing time slots allocated to IDs of the speakers using delimiters.

The multi-channel router 100 may insert the delimiters to the time slots allocated to the IDs of the speakers which will generate audio signals, and transmit the multi-channel audio signal. In FIG. 6, the time slots allocated to the IDs of the speakers 210-250 are expressed by the delimiters.

Figure 7:
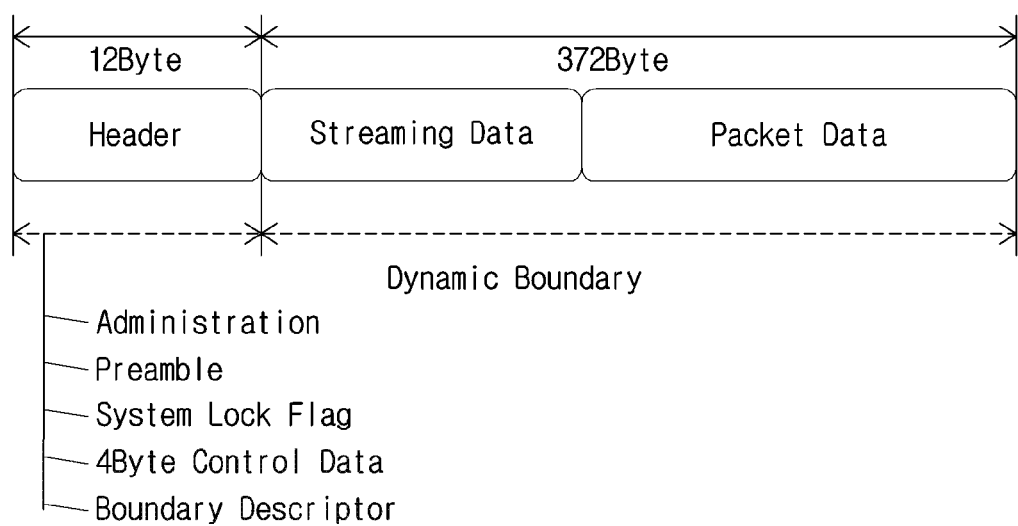
FIG. 7 is a view showing an audio frame structure.

The delimiter may be inserted into the header of an audio frame structure shown in FIG. 7 and transmitted to the speakers 210-250. Accordingly, the speakers 210-250 may reproduce/output only the audio signal selected by the user with reference to the headers of the audio signals.

Figure 8:
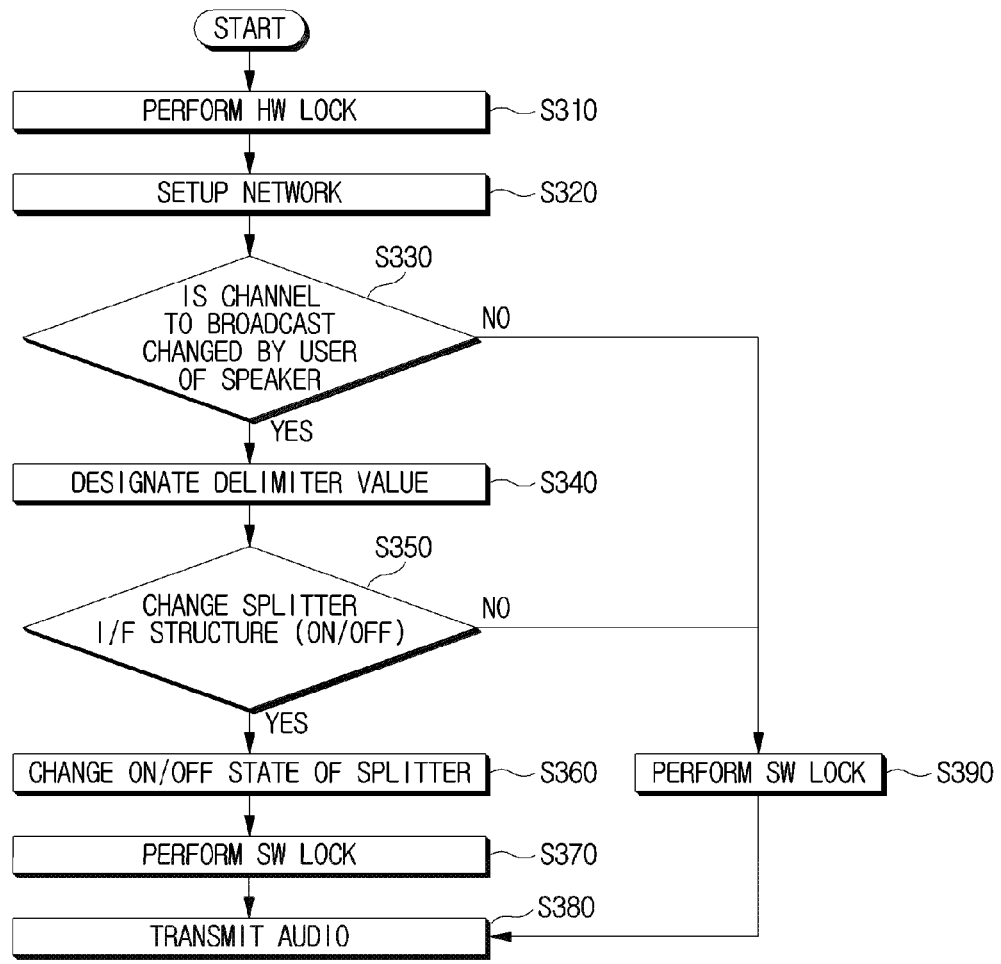
FIG. 8 is a flowchart showing an operation of the in-vehicle audio system shown in FIG. 2.

FIG. 8 is a flowchart showing an operation of the in-vehicle audio system shown in FIG. 2.

As shown in FIG. 8, the multi-channel router 100 performs MOST network lock (S310) and establishes a network (S320).

When a channel to broadcast is changed by the user (S330—YES), the multi-channel router 100 designates a delimiter in the header of a corresponding audio signal such that the speaker of the user reproduces the audio signal of the channel selected by the user (S340).

When the switching state of the optical splitter needs to be changed (S350—YES), that is, when there is a change in the speakers 210-250 to transmit the multi-channel audio signal, the switching state of the optical splitter is changed (S360).

For example, when the user does not want to output an audio through the user's speaker, the switching state of the optical splitter is changed not to transmit the multi-channel audio signal to the corresponding speaker.

Thereafter, the speakers 210-250 perform SW lock and reproduce only the audio signal in which the delimiter is detected from the time slot allocated to the ID thereof from among the audio signals included in the multi-channel audio signal (S370).

Accordingly, the speakers 210-250 output only the audio signal of the channel selected by the user.

On the other hand, when the channel to broadcast is not changed by the user (S330—NO), the multi-channel router 100 transmits the multi-channel audio signal to the speakers 210-250 as it is without performing steps S340-S360, and the speakers 210-250 perform SW lock (S390).

When the switching state of the optical splitter does not need to be changed (S350—NO), the multi-channel router 100 transmits the multi-channel audio signal to the speakers 210-250 without switching as in operation S360, and the speakers 210-250 performs SW lock (S390).

The audio system based on the in-vehicle optical network and the broadcasting method thereof according to exemplary embodiments have been described up to now.

In the above-described exemplary embodiments, the audio channel is selected by the user. However, the audio channel may be selected automatically, rather than being selected by the user.

In addition, in the above-described exemplary embodiments, the multi-channel audio signal includes audio signals of different broadcast channels. However, audio signals for a stereophonic sound (for example, a 5.1 channel sound) may be included.

Although the present invention has been described with an exemplary embodiment, various changes and modifications may be suggested to one skilled in the art. It is intended that the present invention encompass such changes and modifications as fall within the scope of the appended claims.

What is claimed is:

1. An audio system comprising:
a multi-channel router which is connected to an in-vehicle optical network to receive a multi-channel audio signal from audio signals received from the optical network; and
a plurality of speakers which are connected to the multi-channel router to receive the multi-channel audio signal through the multi-channel router,
wherein
each speaker of the plurality of speakers is configured to receive a same multi-channel audio signal,
the multi-channel router is configured to transmit the multi-channel audio signal to all speakers of the plurality of speakers, and configured to transmit the multi-channel audio signal to some speakers of the plurality of speakers,
the multi-channel router and the plurality of speakers are connected with each other through optical fibers,
the multi-channel router comprises an optical splitter, wherein the optical splitter is configured to selectively output the multi-channel audio signal through output terminals connected with the plurality of speakers,
the plurality of speakers are configured to output only some of the audio signals included in the multi-channel audio signal according to a selection by a user,
the plurality of speakers are configured to output only some audio signals with reference to headers of the audio signals, and
the headers of the audio signals comprise delimiters configured to be inserted into time slots allocated to IDs of the plurality of speakers.

2. An audio broadcasting method comprising:
receiving, by a multi-channel router, audio signals from an in-vehicle optical network and generating a multi-channel audio signal;
splitting, by an optical splitter, the multichannel audio signal into a plurality of streams of the multichannel audio signal, wherein a content of each stream of the plurality of streams of the multichannel audio signal is same; and
transmitting, by the multi-channel router, the plurality of streams of the multi-channel audio signal to a plurality of speakers via optical fibers, wherein transmitting each stream of the plurality of streams of the multi-channel audio signal to the plurality of speakers via optical fibers comprises:
transmitting, by the multi-channel router, all streams of the plurality of streams of the multi-channel audio signal to all speaker of the plurality of speakers; or
transmitting, by the multi-channel router, some streams of the plurality of streams of the multi-channel audio signal to some speakers of the plurality of speakers, and
outputting sound by the plurality of speakers,
wherein each speaker of the plurality of speakers outputs only some of the audio signals included in the multi-channel audio signal according to a selection by a user,
each speaker of the plurality of speakers outputs only some audio signals with reference to headers of the audio signals, and
the headers of the audio signals comprise delimiters configured to be inserted into time slots allocated to IDs of the plurality of speakers.

* * * * *